(12) United States Patent
Cutkosky et al.

(10) Patent No.: US 9,908,266 B2
(45) Date of Patent: Mar. 6, 2018

(54) MOLD FABRICATION METHOD FOR GECKO-INSPIRED ADHESIVES

(71) Applicant: The Board of Trustees of the Leland Stanford Junior University, Palo Alto, CA (US)

(72) Inventors: Mark R. Cutkosky, Palo Alto, CA (US); Paul S Day, Menlo Park, CA (US); Eric V. Eason, Boulder, CO (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 211 days.

(21) Appl. No.: 14/924,252

(22) Filed: Oct. 27, 2015

(65) Prior Publication Data

US 2016/0046043 A1 Feb. 18, 2016

Related U.S. Application Data

(62) Division of application No. 13/451,713, filed on Apr. 20, 2012, now abandoned.

(Continued)

(51) Int. Cl.
| | |
|---|---|
| *B32B 5/02* | (2006.01) |
| *B29C 33/38* | (2006.01) |
| *B29C 33/42* | (2006.01) |
| *B29C 33/52* | (2006.01) |
| *B29C 37/00* | (2006.01) |

(Continued)

(52) U.S. Cl.
CPC ...... *B29C 33/3842* (2013.01); *B29C 33/3857* (2013.01); *B29C 33/424* (2013.01); *B29C 33/52* (2013.01); *B29C 37/0053* (2013.01); *B29C 39/006* (2013.01); *C09J 7/00* (2013.01); *C09J 183/04* (2013.01); *B29K 2083/00* (2013.01); *B29K 2105/0002* (2013.01); *B29K 2105/0097* (2013.01); *B29K 2891/00* (2013.01); *B29K 2995/0077* (2013.01); *C09J 2201/626* (2013.01); *Y10T 428/2457* (2015.01)

(58) Field of Classification Search
CPC .................................................. B29C 33/3842
See application file for complete search history.

(56) References Cited

U.S. PATENT DOCUMENTS

| | | | |
|---|---|---|---|
| 6,872,439 B2 * | 3/2005 | Fearing | A44B 18/0003 24/442 |
| 2005/0109438 A1 * | 5/2005 | Collette | B29D 30/0606 152/209.18 |

(Continued)

OTHER PUBLICATIONS

Ito et al., "Effect of selected physical properties of waxes on investments and casting shrinkage", The Journal of Prosthetic Dentistry, vol. 75 No. 2, Feb. 1996, pp. 211-216.*

*Primary Examiner* — Galen H Hauth
(74) *Attorney, Agent, or Firm* — Lumen Patent Firm

(57) ABSTRACT

A method of forming synthetic dry adhesives is provided that includes using a combined wedge indenting and orthogonal machining process to form tapered mold cavities in a mold, filling the tapered mold cavities with an elastomeric adhesive, curing the elastomeric adhesive in the tapered mold cavities, and removing the elastomeric adhesive from the mold, where a plurality of tapered lamellar ridges extend from a surface of the elastomeric adhesive.

10 Claims, 8 Drawing Sheets

Related U.S. Application Data

(60) Provisional application No. 61/517,496, filed on Apr. 20, 2011.

(51) Int. Cl.
    *B29C 39/00*     (2006.01)
    *C09J 7/00*     (2018.01)
    *C09J 183/04*     (2006.01)
    *B29K 83/00*     (2006.01)
    *B29K 105/00*     (2006.01)

(56) References Cited

U.S. PATENT DOCUMENTS

2007/0212667 A1*   9/2007   Jung .................. A61C 13/0004
                                                                                           433/223
2011/0016675 A1*   1/2011   Mayers ...................... C09J 7/00
                                                                                            24/450

* cited by examiner

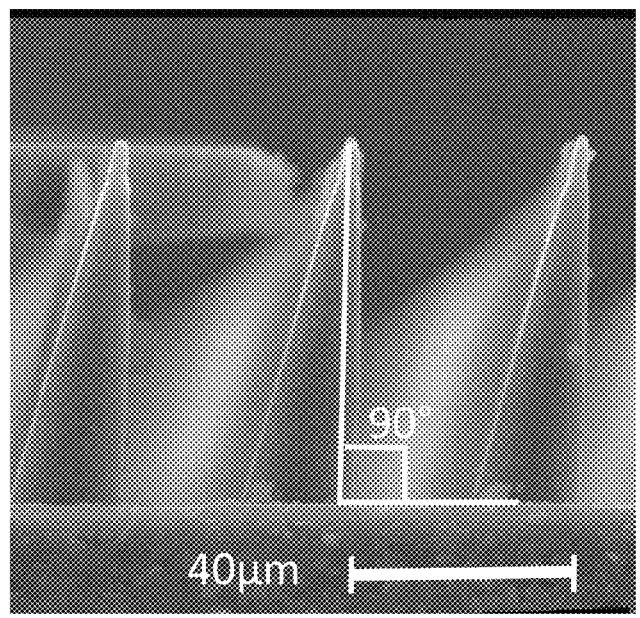
FIG. 1A
Prior Art
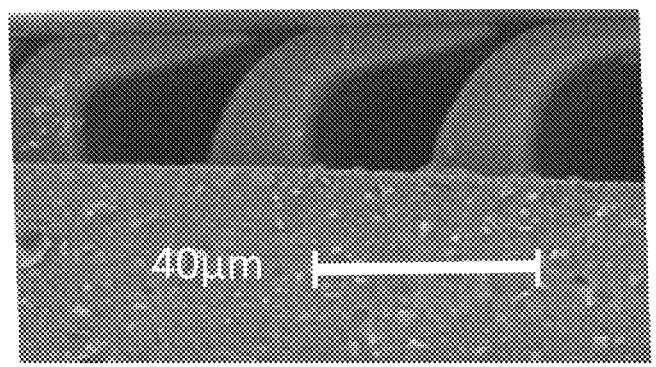
Prior Art    FIG. 1B

☐ Quartz Wafer  ▓ Cured PDMS
■ Uncured PDMS

MOLD FABRICATION METHOD FOR GECKO-INSPIRED ADHESIVES

CROSS-REFERENCE TO RELATED APPLICATIONS

This application is a divisional of U.S. patent application Ser. No. 13/451,713 filed Apr. 20, 2012, which is incorporated herein by reference. U.S. patent application Ser. No. 13/451,713 claims priority from U.S. Provisional Patent Application 61/517,496 filed Apr. 20, 2011, which is incorporated herein by reference.

STATEMENT OF GOVERNMENT SPONSORED SUPPORT

This invention was made with Government support under contract no. W911NF-07-C-0031 awarded by the Department of the Army. The Government has certain rights in the invention.

FIELD OF THE INVENTION

This invention relates to synthetic dry adhesives and methods of making thereof.

BACKGROUND OF THE INVENTION

Impressive advancements have been made in the field of gecko-inspired synthetic dry adhesives. A large range of manufacturing methods for these adhesives has been reported in the literature. However, the use of such adhesives in applications such as climbing has been much more limited, with just a few examples reported. It has generally been found that the adhesion levels generated in real-world climbing applications are significantly lower than those obtained using small samples in bench-top experiments.

One reason for this disparity is that, in addition to conforming to surfaces and generating useful levels of adhesion, the adhesives have additional requirements when used for climbing. The first of these requirements is controllability, i.e., the adhesives should not be sticky in the default state and adhere only when it is desirable. In any other case, energy will be wasted as it is expended in attaching and detaching the adhesive for each step. Controllability can be achieved by using switchable structures or by creating directional adhesive features whose adhesion generation is a function of applied shear load.

The second requirement is durability. The adhesives must undergo thousands of attach/detach cycles without significant loss of adhesive properties and, ideally, should resist fouling and be easy to clean. Durability is also correlated with controllability: gentle attach/detach cycles reduce mechanical wear and promote long life.

Micro-wedges are an example of a synthetic dry adhesive that has been successfully applied to climbing robots. Micro-wedges are simple, controllable, and durable structures that have enabled robots weighing 1 kg and more to climb on glass, plastic, wood paneling, painted metal, and similar surfaces. When unloaded, as shown in an oblique perspective view in FIG. 1a, they present a very small real area of contact with a surface and generate negligible adhesion. However, when loaded in a preferred shear direction, as shown in FIG. 1b, they bend, creating a larger contact area and generating adhesion that is proportional to the shear load. The micro-wedges' asymmetric taper ensures that the radius of curvature of the feature at the proximal edge of the contact patch increases with increasing shear load, allowing the tapered features to outperform features of constant cross-section at high shear loads. Furthermore, they may be easily cleaned using a piece of sticky tape.

In previous work, micro-wedges were manufactured by casting a polydimethylsiloxane (PDMS) silicone elastomer into molds created through a photolithographic process in which SU-8® photoresist (MicroChem Corp.) was subjected to two exposures, one angled, one vertical, through contact masks. The necessity of a thick photo-resist layer combined with the requirement for high precision alignment of exposures resulted in a time consuming, expensive mold fabrication process with relatively low yield.

What is needed is a method of fabricating controllable and durable synthetic dry adhesives that does not use an expensive photolithographic process, and which provides synthetic dry adhesives with performance in climbing and other applications that is comparable to or better than the micro-wedges used in previous work.

SUMMARY OF THE INVENTION

To address the needs in the art, a method of forming synthetic dry adhesives is provided that includes using a combined wedge indenting and orthogonal machining process to form tapered mold cavities in a mold, filling the tapered mold cavities with an elastomeric adhesive, curing the elastomeric adhesive in the tapered mold cavities, and removing the elastomeric adhesive from the mold, where a plurality of tapered lamellar ridges extend from a surface of the elastomeric adhesive.

According to one aspect of the invention, the mold includes a homogeneous wax composition having a Young's modulus to yield stress ratio E/Y greater than 100.

In a further aspect of the invention, the wedge indenting and orthogonal machining process includes using a wedge-shape tool. In one aspect, the wedge-shaped tool includes at least a primary bevel. In another aspect, the wedge-shaped tool includes a primary bevel, a secondary bevel and a tertiary bevel. In further aspect, the wedge-shaped tool includes a lubricated surface. In yet another aspect, the wedge-shaped tool is moved along a 2-dimensional or 3-dimensional trajectory into the mold until a tip of the wedge-shaped tool reaches the depth t below a top surface of the mold. In on aspect a trajectory of the wedge-shaped tool is controlled to move displaced mold material in a desired direction, where the mold cavities are desirably spaced and a shape of the cavities is controlled. In another aspect of the invention, a centerline of the wedge-shaped tool is set at an angle $\lambda$ with respect to a top surface of the mold, where a trajectory of the tool is at an intermediate angle $\theta$ with respect to a top surface of the mold, where the angle $\theta$ is in a range of $0<\theta<\lambda$.

According to a further aspect of the invention, the elastomeric adhesive includes an elastomer selected from the group consisting of silicones, polyurethanes, and polypropylene.

In a further aspect of the invention, the substrate surface comprises a smooth or textured surface, where the surface is disposed to transfer a desired smoothness or desired texture to a film of the uncured elastomeric material as the uncured elastomeric material cures.

According to another aspect of the invention, a siping step is used when the adhesive is de-molded, where the siping step comprises a cut perpendicular to the extending tapered lamellar ridge at a desired frequency to improve adhesion on textured surfaces having micro-scale roughness, where independent adhesive sections of the extending tapered lamellar ridge conform to the textured surface.

BRIEF DESCRIPTION OF THE DRAWINGS

FIGS. 1A-1B show prior art SEM micrographs of PDMS directional adhesive features: (A) perspective view of unloaded micro-wedges from a photolithographic mold, (B) planar view of micro-wedges under shear loading

FIG. 4A-4E show a diagram of the steps for treating the tips of the extending tapered lamellar ridges with a film of elastomeric material, according to one embodiment of the invention.

DETAILED DESCRIPTION

Directional dry adhesives are inspired by animals such as geckos and are a particularly useful technology for climbing applications. Previously, they have generally been manufactured using photolithographic processes. The current invention provides a micro-machining process that makes cuts in a soft material using a sharp, lubricated tool to create closely spaced negative cavities of a desired shape. The machined material becomes a mold into which an elastomer is cast to create the directional adhesive. The trajectory of the tool is varied to avoid plastic flow of the mold material that may adversely affect adjacent cavities. The relationship between tool trajectory and resulting cavity shape is established through modeling and process characterization experiments.

The micro-machining process of the current invention is much less expensive than previous photolithographic processes used to create similar features and allows greater flexibility with respect to the micro-scale feature geometry, mold size, and mold material. The micro-machining process produces controllable, directional adhesives, where the normal adhesion increases with shear loading in a preferred direction. This is verified by multi-axis force testing on a flat glass substrate. Upon application of a post-treatment to improve the smoothness of the engaging surfaces of the features after casting, the adhesives significantly outperform comparable directional adhesives made from a photolithographic mold.

One embodiment of the current invention includes a mold created with a micro-machining process that involves making a pattern of cavities in a mold using a narrow cutting tool. Machining processes have been used previously to create stamps for soft lithography and synthetic adhesive structures using nano-indenters and AFM tips, but neither fabrication nor testing of macroscopic adhesive arrays (~1 cm$^2$) has been demonstrated, the aspect ratio of the resulting features has been low, and the features have not been closely spaced. This in turn leads to unused space between features, decreased real area of contact, and decreased adhesive performance.

Figure 5A:
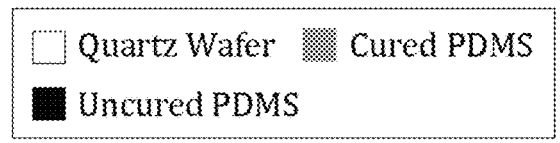
FIG. 5A-5B show perspective drawings of post-treated wedge-shaped lamellar ridges before and after a siping step, according to one embodiment of the invention.

The current invention provides a micro-machining process that is a hybrid of orthogonal machining and wedge indenting. According to one embodiment, a sharp wedge-shaped tool is moved along an oblique trajectory into a soft mold surface, producing wedge-shaped cavities of depth on the order of up to 500 µm and of any desired width, for example. By controlling the tool geometry and trajectory and repeating this operation in a pattern across the mold surface, it is possible to obtain a dense packing of sharp, wedge-shaped cavities. As an example, casting PDMS into these cavities produces micro-wedge lamellar features as seen in FIG. 5A. In comparison to photolithography, the method presented here is cheaper, faster, and affords greater freedom to control the cavity geometry, which governs adhesive performance.

The main motivation of the current invention is the need for a practical adhesive for climbing. The new micro-machined features, upon application of a post-treatment process according to another embodiment (see FIGS. 2A-2C and FIGS. 4A-4E), perform significantly better than photolithographic micro-wedges in adhesive tests, where the post-treatment process includes treating a tip of the extending tapered features with a film of uncured elastomeric material disposed on one or both sides of the features, and a treatment transfer substrate is disposed to transfer a desired smoothness or desired texture to the uncured film as it cures. The improvement is partly a result of having greater freedom to control the wedge taper and angle of inclination. Arrays of the new features have been produced and tested, with maximum normal adhesion of 38 kPa attained at a shear stress of 49 kPa for an array of area 1.21 cm$^2$.

In addition, the micro-machined features formed by the method of the current invention retain the controllability and durability of photolithographic micro-wedges.

In order to better understand the mechanics involved, a micro-machining process may be described using numerical finite-element modeling or semi-analytic theoretical models. Theoretical models are mostly applied to ideal rigid-plastic materials and are not as likely to accurately predict the forces and deformations. Conversely, state of the art numerical models can account for realistic material behavior and friction effects. However, the material properties and tribological behavior of the wax mold material used here have not been sufficiently well characterized to justify a numerical model. Moreover, it is not required to produce a numerical prediction of the cutting forces in terms of the cutting parameters (e.g. cutting depth, speed, friction, tool angle, or tip radius) as the forces are, in any case, quite low.

Instead, it is useful to understand how the cutting parameters and tool geometry affect the deformation behavior. In particular, it is desirable to produce a tightly packed array of cavities in order to obtain a high density of adhesive features. Accordingly, an important question is whether displaced material is moved mainly in the forward direction (towards the unmachined part of the mold) or the rearward (tending to close up the previously made cavity). Semi-analytic theoretical models can provide this insight without recourse to running numerous simulations, which may be poorly convergent or sensitive to boundary conditions and may require frequent re-meshing due to the large deformations involved.

If the cutting depth t and the tool cross-section are constant along the width of the cavity (into or out of the page in FIGS. 3A-3B), and if t is much smaller than the width of the cavity, then the stressed material is confined to a long, narrow prismatic region. In the experiments described here, t≤100 μm and the cavity width is greater than 10 mm, so it is reasonable to assume that the material is in a state of plane strain.

Figure 2A:
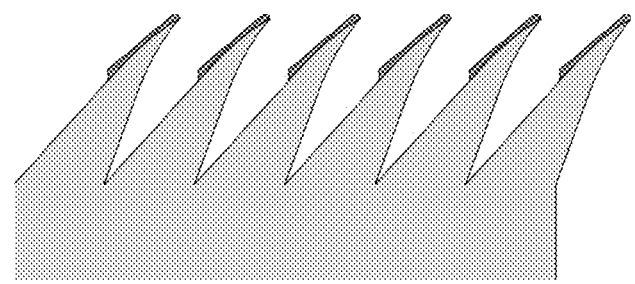
FIG. 2A-2C show cross-section views of wedge-shaped lamellar ridges having cured elastomeric material with a desired smoothness or texture on one or both sides of the wedge-shaped lamellar ridge, according to some embodiments of the current invention.
Figure 2B:
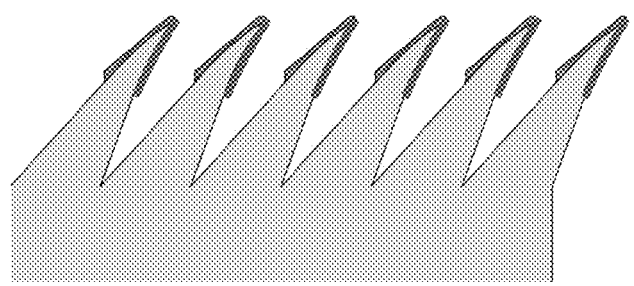
Figure 2C:
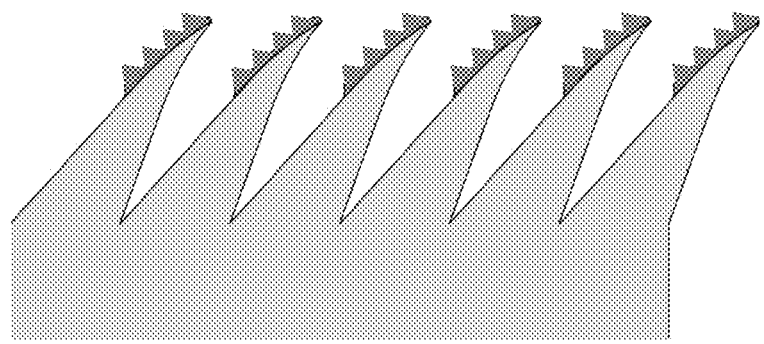
Figure 3A:
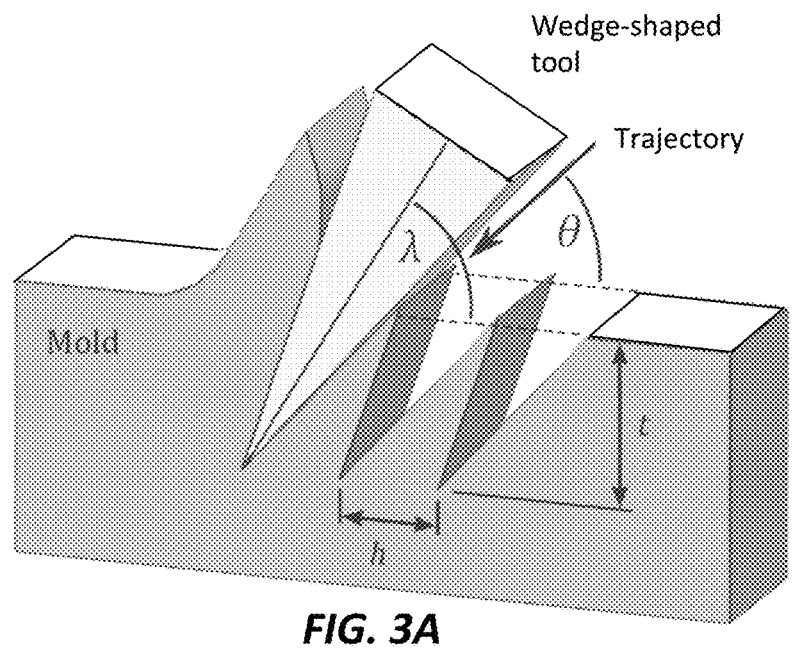
FIG. 3A-3B show diagrams of the geometry and the parameters of the micro-machining process for a single cavity, where "Traj." is the tool trajectory; "S.P." is the shear plane, according to one embodiment of the invention.
Figure 3B:
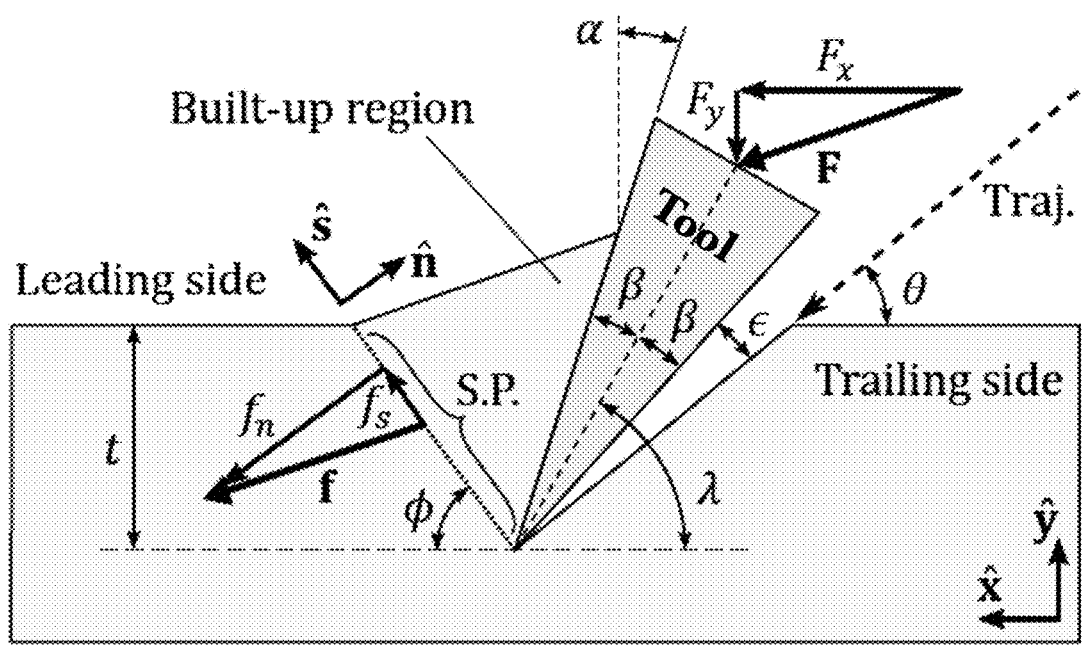
Figure 4B:
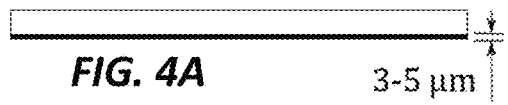
Figure 4B:
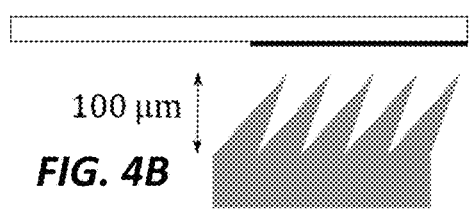
Figure 4C:
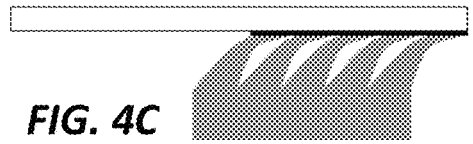
Figure 4D:
Figure 4E:
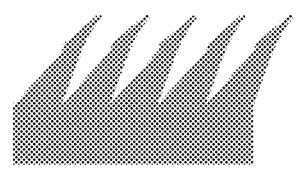

The process bears resemblance to two classical problems from plane-strain plasticity theory: oblique wedge indenting, in which a rigid wedge-shaped tool penetrates the work surface, and orthogonal machining, in which the tool removes a thin strip of material by moving parallel to the work surface. The process according to the current invention is a generalization of the two processes: the tool is wedge-shaped with internal angle 2β, the centerline of the tool is set at an angle λ with respect to the work surface, and the direction of motion of the tool is neither parallel to the centerline (as in wedge indenting) nor to the work surface (as in orthogonal machining), but instead is set at an intermediate angle 0<θ<λ, as shown in FIGS. 3A-3B.

To model this process analytically, it is assumed that the work material is perfectly rigid-plastic. While most plasticity studies have been concerned with the plastic behavior of metals, wax has also been used as a work material, and waxes can be closer to rigid-plastic than metals. The wax used in this example has been found through axial compression testing to have a low shear yield strength (approximately 2 MPa) and little work hardening; however, it does exhibit some elastic recovery, which can affect the forces and cavity geometry during micro-machining.

Given these assumptions, it is feasible to adapt an existing semi-analytic model to the present situation to obtain an estimate of the flow of material on both sides of the tool and the expected buildup region adjacent to the cavity.

For a perfect rigid-plastic material, the interior shape of the cavity will be identical to the swept volume of the tool as it moves along its trajectory, which means that any trajectory angle θ can be chosen from the range λ−β<θ<λ+β without affecting the shape of the cavity. However, the extent of plastic deformation and the amount of buildup occurring on the leading and trailing faces of the tool will vary with θ. If material is displaced on both sides of the tool, and the mold cavities are spaced closely, this flow will result in partial collapse of the previously formed cavity.

In order to minimize this effect, the trajectory angle may instead be chosen to lie outside this range: θ=λ−β−ε, where ε>0 is a relief angle. This increases the angular width of the cavities by the angle ε. This geometry can be seen in FIGS. 3A-3B. The benefit of the relief angle is that the trailing side of the tool should no longer make contact with the wall of the cavity. As a result, assuming that the tip of the tool is sufficiently sharp, the zone of plastic deformation is limited to the leading side of the tool only, and material on the trailing side remains rigid throughout the process, theoretically preventing partial collapse of the previous cavity. In one aspect of the invention, the angle of the centerline of the resulting adhesive feature produced by this process is up to 50 degrees relative to the normal direction.

Two possibilities are predicted for the plastic deformation on the leading side of the tool.

In the first case, the plastic region covers the entire area of displaced material, and it is possible to construct a slip-line field throughout this region. In the second case, the plastic region is restricted to a single shear plane, and elsewhere the material is rigid.

This second case occurs if the trajectory angle is lower than a critical value:

$$2 \tan \theta < [1+\tan(\alpha+\theta)]^2 \quad (1)$$

However, this equation is always satisfied if the rake angle α is positive, as in the present case. Therefore, the model predicts that a single shear plane solution is appropriate on the leading face of the tool. The model also provides a prediction of the shear plane angle φ based on an energy-minimization argument, but since the model does not include friction this prediction is not expected to be accurate. Furthermore, there is doubt about the theoretical and experimental validity of this argument.

Despite the lack of a trustworthy prediction of the shear plane angle φ, the model can be used to make a testable prediction about the cutting forces if φ can be measured experimentally. Let the net force applied by the machine to the tool be denoted by $$F=F_x\hat{x}+F_y\hat{y} \quad (2)$$

and let the total force on the shear plane be denoted by $$f=f_s\hat{s}+f_n\hat{n} \quad (3)$$

as shown in FIGS. 3A-3B. In accordance with the model, it is assumed that the displaced material is limited to a triangular built-up region also shown in FIGS. 3A-3B. As long as there is no contact on the trailing side of the tool, these forces are equal: F=f, and therefore:

$$f_s=F_x(\hat{x}\cdot\hat{s})+F_y(\hat{y}\cdot\hat{s})=F_x \cos \phi + F_y \sin \phi \quad (4)$$

This relationship does not require any assumptions about the shear plane angle φ or the friction at the leading side of the tool. Finally, according to the theory of perfect rigid-plastic materials in plane strain, the shear stress along the shear plane is constant and equal to the shear yield stress k:

$$f_s/A=k \quad (5)$$

where A is the area of the shear plane.

Although the semi-analytic model cannot be expected to produce a complete prediction of the cutting forces with high accuracy, it produces a useful prediction about the deformation mode of the material (the existence of a shear plane), and it is also useful for understanding relationships among λ, β, θ, and φ. This leads to the expectation that most of the displaced material will be pushed forward if the trajectory angle, θ, is sufficiently small compared to the angle of the trailing face of the tool, λ−β. In this situation, the model does produce a testable prediction about the cutting forces (Eqs. 4 and 5).

The mold fabrication method of the current invention relies on a few key components to be effective. Most important is the wedge-shaped tool, whose shape strongly influences the shape of the resulting mold cavities. The tool used in this example is a PTFE-coated steel disposable microtome blade (Delaware Diamond Knives D554X). This tool has a fine surface finish, with blade roughness on length scales <<1 μm, an internal angle of 2β≈24°, and an edge radius of less than 0.9 μm.

The material used for the mold must also be selected for desirable properties. An ideal material for machining would have a homogeneous composition, a relatively low yield strength, and perfect rigid-plastic behavior to minimize elastic recovery of the machined region. Rigid-plastic behavior is most likely to occur in micro-machining processes of the current invention if the included angle of the tool is acute and the ratio of Young's modulus to yield stress E/Y is large. According to one aspect, the mold includes a material composition having a Young's modulus to yield stress ratio E/Y greater than 100.

In one embodiment, a soft, rolled sheet wax (Kindt-Collins Master® Regular Sheet Wax) is used, having a ratio of Young's modulus to yield stress of approximately E/Y≈110-160. For this value of E/Y with a tool angle of 24°, the deformation behavior is not dominated by elastic effects and rigid-plastic behavior may be possible.

Adhesive wear at the tool-mold interface is undesirable and could lead to a poor surface finish. However, this is mitigated by lubricating the interface, according to one embodiment. In addition a post-treating process has been devised to refinish the surfaces entirely. For these reasons the tribological properties of the mold material are not a major concern for material selection.

The micro-machining process according to one embodiment of the invention, may be performed on a standard CNC milling machine or other machine with positioning control in at least two axes and sufficient accuracy. In the current example of the invention, adhesives have been produced using a tabletop CNC milling machine with 1 μm precision (Levil WL400), a larger CNC milling machine with 2.5 μm precision (Haas VF-OE), and a motorized stage with an estimated accuracy of ±1 μm (Velmex MAXY4009C-S4 and Newport GTS30V).

Ultimately, the dimensions of an adhesive patch are constrained only by the width of the microtome blade and the length of the workspace of the machine. With the equipment described above, it is possible to make a single uninterrupted patch of adhesive as large as 76 mm wide by 762 mm long or longer.

First, the wax is melted and cast into a block to improve the consistency of its plastic behavior and to obtain a desirable form factor for fixturing, and then it is cooled to room temperature. The mold surface is milled and planed to ensure it is flat and parallel to the machine ways. Next, the surface is cleaned and the micro-machining tool is mounted to the machine head. The blade is fixed so that its centerline is tilted by a constant angle of λ=60° with respect to the horizontal surface of the wax (see FIGS. 3A-3B). The tip of the blade is then aligned to the wax surface.

The tool is moved by the machine along a specified 2-D or 3-D trajectory into the wax until its tip reaches a desired depth t in the negative y-direction (see FIGS. 3A-3B). At this point the tool is retracted above the surface and then advanced a set distance in the positive x-direction to create a space between cuts. The cycle then repeats.

The tool trajectory may be chosen from a large space of possible paths. Varying the trajectory provides freedom to control the completed cavity shape and the plastic flow of the mold material.

Without lubrication, adhesive wear occurs between the tool and the mold material. SEM examination of the features cast from these molds indicates significant surface roughness on critical areas such as the engaging faces that will ultimately generate adhesion. To address this issue, a lubricant may be added to the process to inhibit material transfer from the wax mold to the tool. Several fluids were tested, including various mixtures of water and surfactants in the form of liquid dish soaps. Surface roughness was measured by capturing stereoscopic SEM images and generating 3D topographical plots using the Alicona Imaging MeX software package. Average roughness data were taken across line profiles over the engaging surfaces of the features. The best surface finish, corresponding to an RMS roughness of approximately 39 nm, was obtained with a 10:2 concentration of Ajax liquid dish soap (Colgate-Palmolive) to water.

The completed mold is cleaned with solvents and water to remove all traces of lubricant. A PDMS silicone elastomer (Dow Corning Sylgard® 170) is vacuum de-gassed and poured into the mold. Other materials can include elastomers such as silicones, polyurethanes, or polypropylene. For samples for adhesion force testing, a 300 μm thick backing layer of PDMS is desired. This can be achieved by spinning the mold at 160 RPM for 30 seconds, or alternatively a two-part mold may be created by placing a flat sheet of glass upon 300 μm supports, which rest on the wax mold surface. For climbing applications, the sheet of glass may be replaced by a rigid tile made of glass fiber or aluminum. The tile is treated with a primer (Dow Corning PR-1200), which allows the PDMS to bond directly to the tile. In any case, the casting is then allowed to cure at room temperature for 24 hours (heat acceleration is also possible). Once removed from the mold, the elastomeric adhesive is ready for use. The mold may become damaged as the castings are de-molded, in which case the mold may be resurfaced and micromachined again before its next use.

Figure 5A:
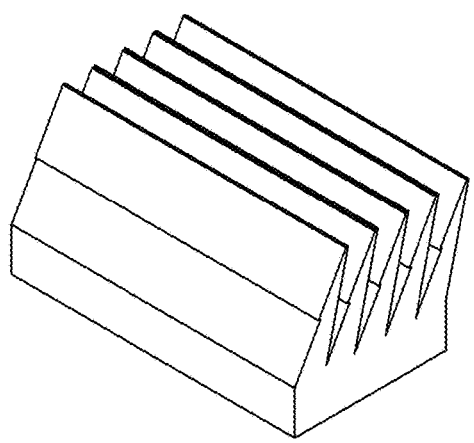
Figure 5B:
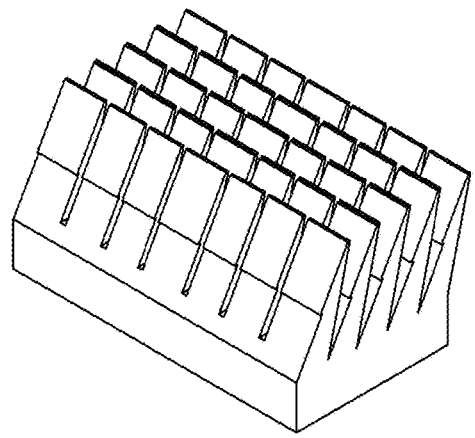

While the addition of lubrication to the micro-machining process improves the surface finish of the molds and molded features, there is still some remaining roughness that can affect the performance of the adhesives by reducing the real area of contact between the adhesive and the substrate. In order to further reduce this roughness, a post-treatment is employed after casting. This treatment adds a thin secondary layer of PDMS to the engaging faces of the molded features. This layer may be smooth or textured as desired. In the case of a smooth layer, the treatment proceeds as follows (see FIGS. 4A-4E):

1. Uncured PDMS is diluted to a concentration of 10% toluene by volume. The diluted mixture is then poured onto a four-inch quartz wafer and spun at 8000 RPM for 60 seconds to obtain a uniform thin layer 3-5 μm thick.
2. One half of the wafer is cleaned using isopropyl alcohol, and the wafer and a cast adhesive sample are secured to a three axis motorized positioning stage.
3. The sample is brought into contact with the PDMS-coated half of the wafer. After applying a normal load so that the features are in contact with the wafer over approximately one third of their length, the features are taken out of contact, leaving a thin, wet layer of PDMS on the tips of the features.
4. After this "inking" procedure, the features are loaded against the cleaned half of the wafer and held there in order to flatten this thin, wet layer as it cures.
5. The cured thin layer binds strongly to the previously cured features. The post-treatment results in smooth patches of PDMS on the engaging faces of the features (see FIG. 5).

For a climbing adhesive, which has been cast directly to a rigid tile, the post-treatment may be done without the motorized positioning stage, by simply using an appropriately sized weight. In this variation of the process, the wafer is placed on a flat surface, the adhesive is placed on the wafer (with the back of the tile facing up), and the weight is placed on the tile. The best post-treatment results have been obtained using weights such that the average pressure is approximately 7-8 kPa, but this depends on the shape and stiffness of the features.

Experiments were performed to test the semi-analytic model introduced above, to empirically characterize the micro-machining process, and to measure the adhesive performance of macroscopic arrays of micro-machined micro-wedges. However, it is first necessary to look more closely at the geometry of the microtome blades used here as micro-machining tools.

Figure 6:
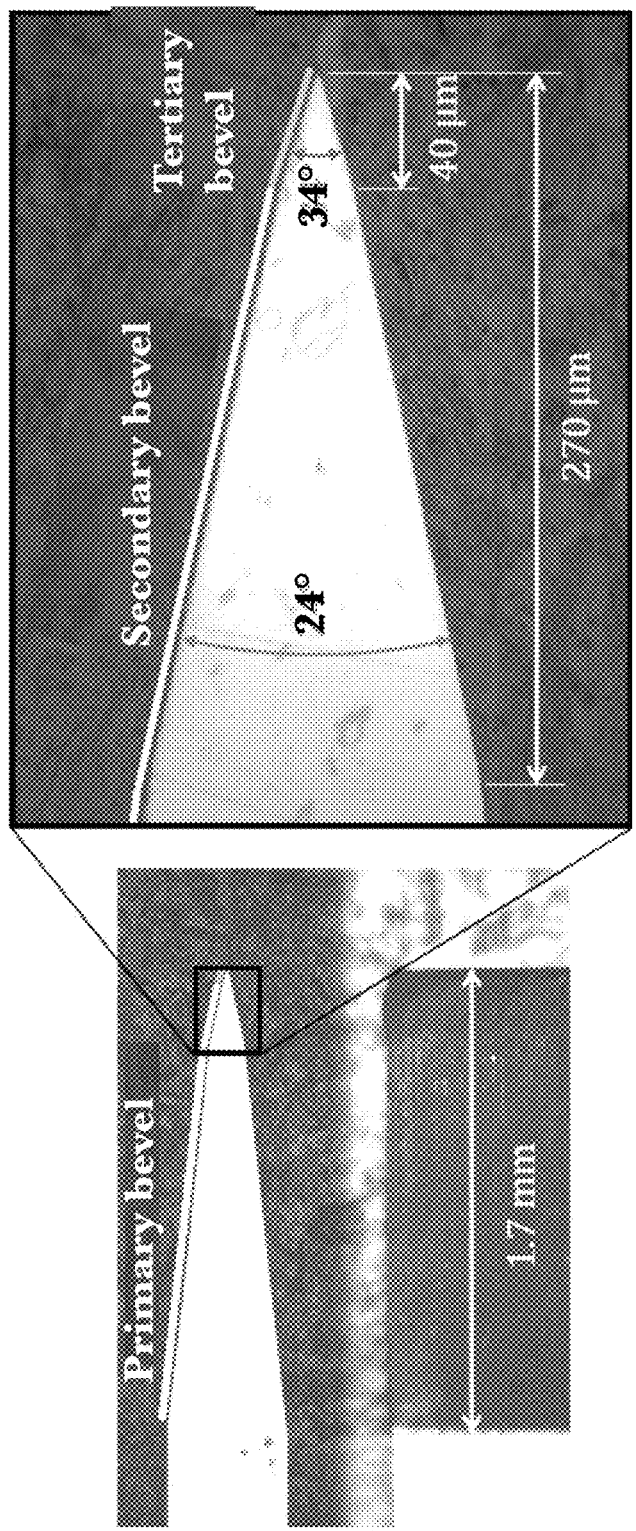
FIG. 6 show cross-section views of a microtome blade having three different beveled sections the wedge-shaped tool bevels, according to one embodiment of the invention.

According to one aspect of the current embodiment, the wedge-shaped tool includes a wedge, or at least a primary bevel. As seen in the embodiment shown in FIG. 6, the shape of the tool is not simply a primary bevel. Instead, the wedge-shaped tool is sharpened to a profile with three different beveled sections. According to one embodiment, the primary bevel begins approximately 1.7 mm from the tip and has an angle of 12° (this section is above the wax mold at all times). The secondary bevel begins 270 µm from the tip and has an angle of 24°, and the tertiary bevel extends over the final 40 µm of the blade's length and is 34° wide. The tip is too small to be seen at this magnification, but an upper limit radius of 0.9 µm may be established.

In the described machining geometry, the border between the secondary and tertiary bevels is below the surface of the wax whenever the blade is inserted more than 40 µm deep. However, the mold cavities created by the micro-machining process (with a nominal depth of 100 µm) show little evidence of this border, and the terminal angle of the features is considerably narrower than the tertiary blade bevel.

This implies that there is significant elastic behavior occurring in the mold material, as the tips of the mold cavities are narrowing by several degrees when the blade is retracted. This effect is observed for single cavities as well as arrays of cavities.

To test the predictions of the semi-analytic model, the cutting forces during micro-machining were measured. A wax specimen of width 1 cm was attached to a six-axis force/torque sensor (ATI Gamma SI-32-2.5) which was mounted in a CNC milling machine, and a variety of micro-machining trajectories were used to create cavities in the wax. The trajectories were linear and differed by trajectory angle, ranging from $\theta=36°$ to 60°, and maximum depth, ranging from t=20 µm to 100 µm. The blade centerline angle was $\lambda=60°$ in all cases, an angle found empirically to produce features with the desired directional behavior. In this exemplary experiment, the cavities were spaced far apart (0.5 mm tip-to-tip) so that the interaction between them was negligible. The blade was wider than the wax specimen so that its corners were not in contact.

Figure 7A:
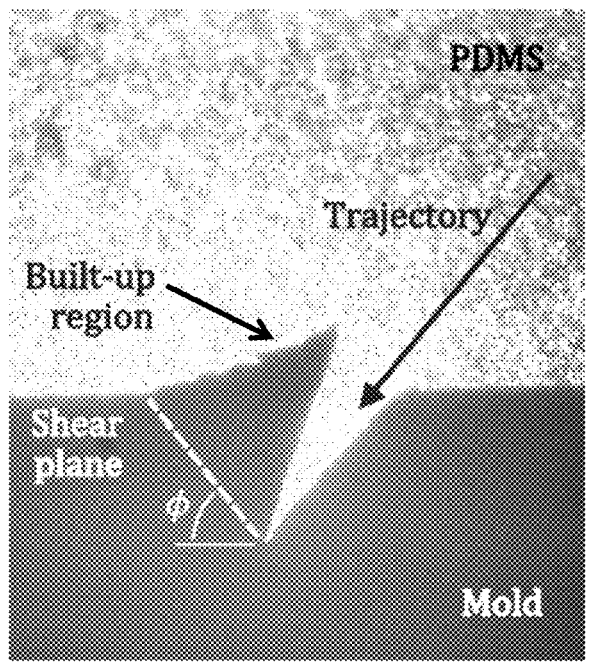
FIG. 7A-7B a micrograph of a single mold cavity created in cutting force tests showing triangular built-up region, and measured shear stress with values of shear yield stress k for comparison (T, S, and C correspond to trajectories parallel to the tertiary bevel, secondary bevel, and centerline of the tool), according to one embodiment of the invention.

The resulting force data were analyzed to find the cutting force F corresponding to the endpoint of each trajectory, the point in time when the tool was at its maximum cutting depth t for each cavity. The final cavity shape, preserved by casting PDMS into the specimen, serves as a record of the shape of the cavity at that same point in time. As shown in FIG. 7a, these castings clearly show the triangular shape of the built-up material adjacent to the leading side of the tool (consistent with the model). By constructing a line from the tip of the cavity to the front edge of the built-up region, and taking into account the width of the wax specimen, it is possible to measure the area of the shear plane A and the shear plane angle $\phi$ (FIG. 7A).

For each cavity, the value of F was projected onto the shear plane using Eq. 4 to produce an estimate of the shear stress $f_s/A$. This assumption is only accurate if there is no contact between the trailing side of the tool and the wax. If there is such contact, the measured cutting force will be the sum of forces at the leading and trailing tool faces, which cannot be separated using external measurements.

Figure 7B:
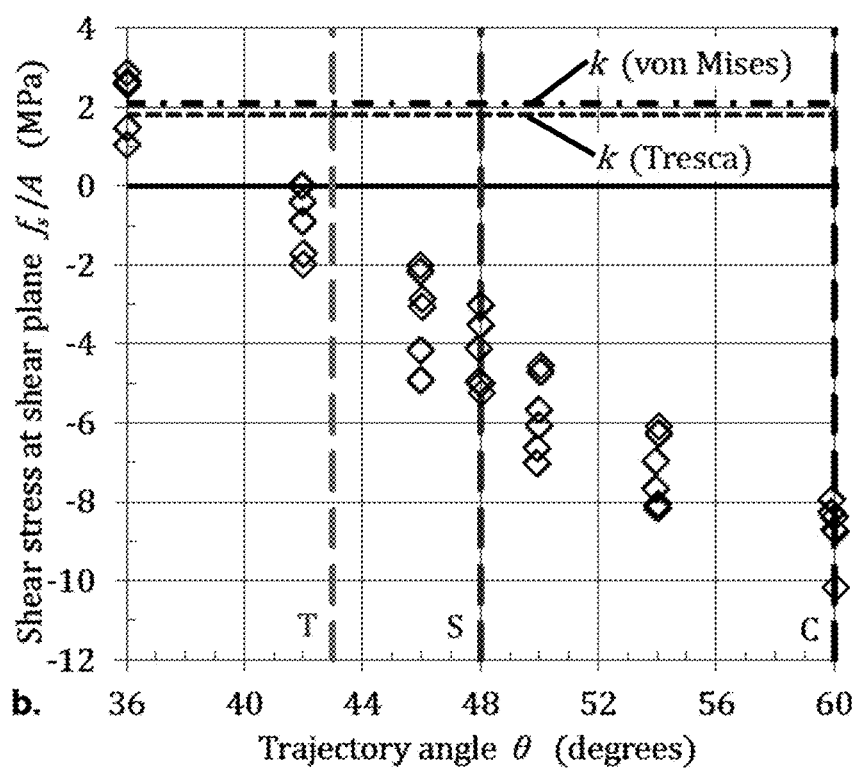

The measured values of $f_s/A$ versus $\theta$ are plotted in FIG. 7B, as well as the shear yield stress of the wax k, calculated using both the Tresca and von Mises shear yield criteria, derived from the compressive yield stress, which was determined through axial compression testing.

Even though the cutting depth varied from t=20 µm to 100 µm for each trajectory, causing some variance in the data, the trend is the same for all values of t. For trajectories near $\theta=\lambda=60°$, there is substantial disagreement between the measurements of $f_s/A$ and the value of k, using either the Tresca or von Mises yield criteria. The direction of the cutting force F is nearly antiparallel to the shear plane, causing f to be negative instead of positive. This may be due to contact forces on the trailing side of the tool because, for trajectories $\theta>43°$, it is expected that the secondary or tertiary bevels will contact the wax on the trailing side, due to the blade geometry.

For trajectories $\theta<43°$, it is expected that there is no contact on the trailing side of the tool and therefore the measured value of $f_s/A$ should be equal to k in accordance with Eq. 5. Indeed, the data for the shallowest trajectory, $\theta=36°$, are in agreement with Eq. 5. However, the data for $\theta=42°$ are not. This disagreement cannot be explained completely by the geometry of the blade. In this case, it is likely that contact is occurring on the trailing side of the blade. This may be due to elastic recovery of the wax (which was assumed negligible in the model) or it may be that the tribological interaction between the tool, lubricant, and mold surface is more complicated than can be described in this simple model.

In summary, the evidence appears to invalidate the assumption that the material on the trailing side of the tool is rigid, for the majority of the micro-machining trajectories tested. Theoretical modeling has provided useful qualitative insight into the micro-machining process, but the models considered here are unable to explain the actual cutting forces, and they cannot necessarily be used to predict the deformation of the mold material in a process that involves multiple cavities being formed in series. These realizations prompted an empirical investigation of the micro-machining process.

Predicting the cutting force is not strictly necessary to produce a useful adhesive mold insofar as the forces are small enough not to damage or significantly deflect the micro-machining tool. However, it is important to ascertain the effect of the micro-machining trajectory on the shape of the mold cavities. To accomplish this, a characterization experiment was performed in which the trajectory angle was varied (again from $\theta=36°$ to 60°) while the nominal depth and tip-to-tip spacing of the cavities were kept constant at 100 µm and 60 µm respectively. At this depth and spacing, the cavity shapes were expected to be significantly influenced by neighboring cavities, so a series of ten cavities was made for each trajectory.

PDMS was cast into the mold cavities and the resulting adhesive samples were cut in cross-section and measured with a microscope, as shown in FIGS. 8A-8D. Ten cavities appear to be sufficient to attain a steady-state shape; the boundary conditions are different for the initial cavity, but this only affects the first three cavities or fewer. In addition, the final cavity is sometimes a different shape from the previous ones. In these cases, the final cavity shows the shape of an incipient cavity before it has been deformed to its completed shape by the cavity following it. The 4th-9th cavities are representative of the completed shapes that would be created in a large adhesive array.

Figure 8A:
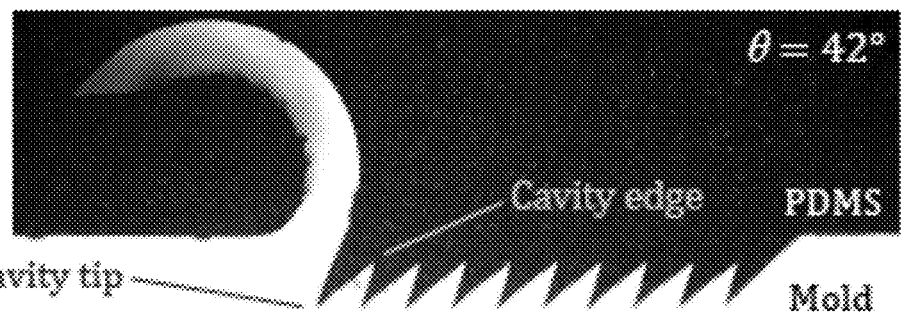
FIGS. 8A-8D show micrographs of the effect of trajectory angle on mold cavity shape. For some trajectories (A-B), a continuous chip of built-up material is formed after the final cavity, according to one embodiment of the invention.
Figure 8B:
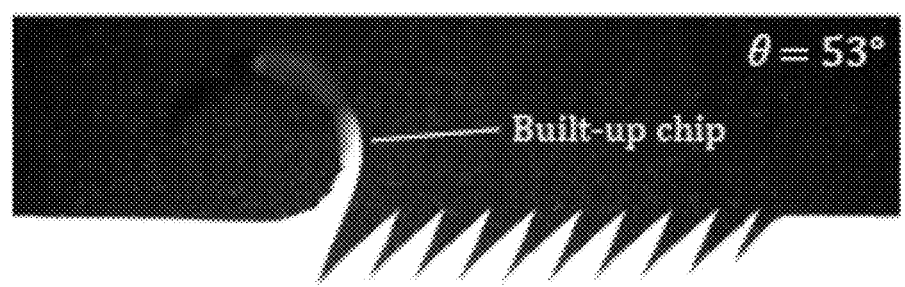
Figure 8C:
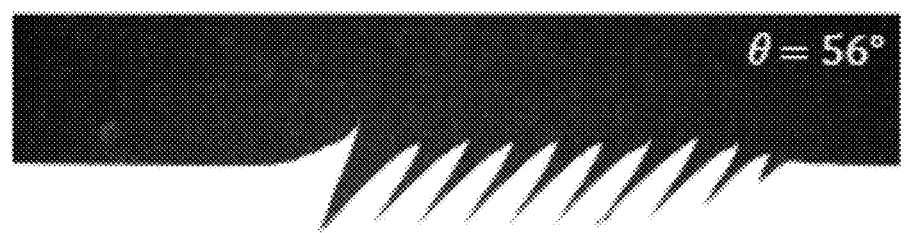
Figure 8D:
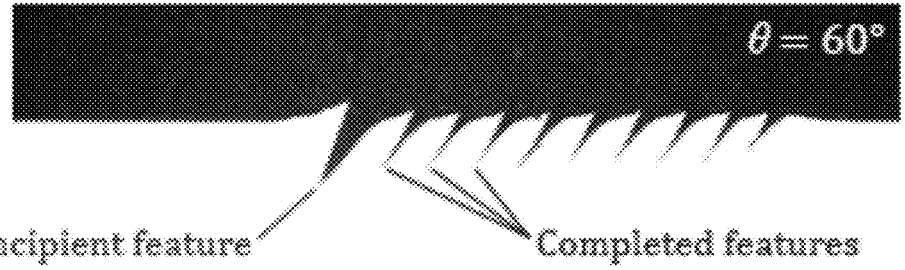
Figure 9:
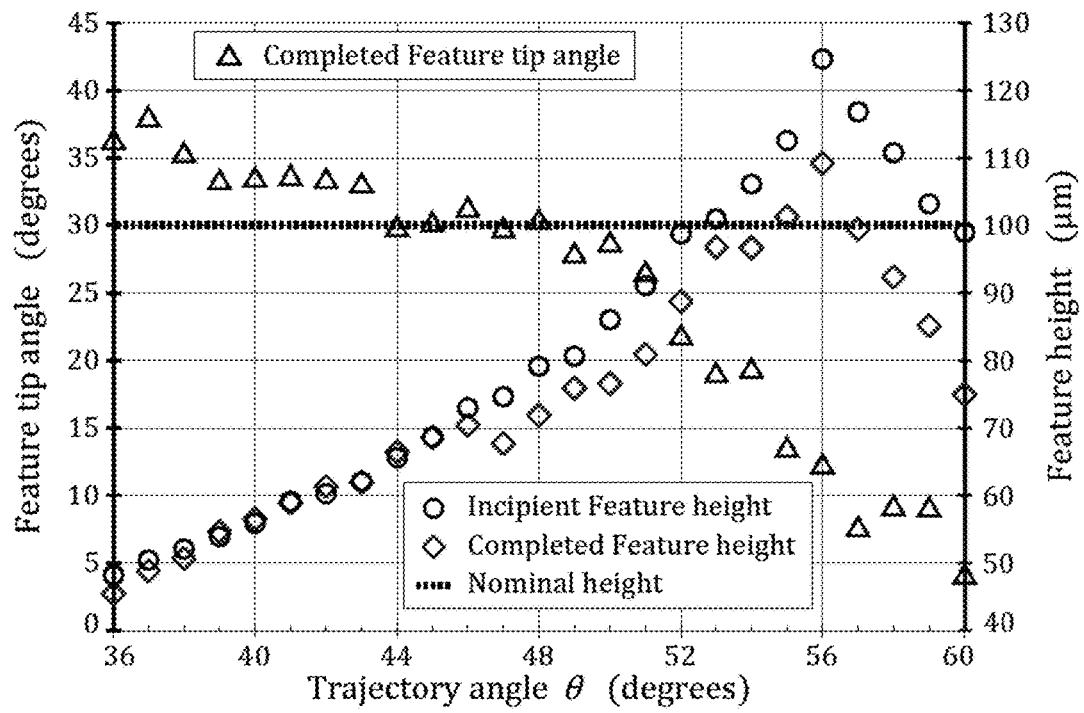
FIG. 9 shows geometric data taken from characterization experiment micrographs (FIGS. 8A-8D), according to one embodiment of the invention.

The height and angular width of the cavities change with the trajectory angle due to several concurrent effects. For values of θ near 36°, the feature height is significantly less than the nominal height of 100 μm because the cavities intersect one another below the original mold surface (FIG. 8A). As θ increases past 46°, there is an increasingly large difference in height between the incipient feature and the completed features (FIG. 8B), indicating that permanent deformation on the trailing side of the tool is occurring. The feature height reaches a maximum at θ=56°, where the trailing-side deformation causes the edges of the cavities to be raised up above the original mold surface (FIG. 8C). As θ is increased further to θ=λ=60°, the features become shorter again and the tip angle diminishes well below the angular width of the blade, indicating that the rearward deformation is causing the cavities to close up at their tips (FIG. 8D). These trends are plotted in FIG. 9.

Samples of micromachined adhesives were fabricated to test their adhesive properties. The blade was held at θ=60° and the trajectory was chosen to be θ=48°, an angle approximately parallel to the rear face of the tool, and found empirically to push most of the displaced material forward. The nominal depth and tip-to-tip spacing were 100 μm and 60 μm. According to one aspect of the invention, the resulting cast synthetic adhesive can have wedge-shaped ridges with a tip-to-tip spacing as low as 6 μm.

Adhesion force data were collected on an instrumented stage capable of moving the adhesive samples in and out of contact with a flat glass substrate along a specified trajectory and loading the adhesive in both the normal and shear directions. The stage (Velmex MAXY4009W2-S4 and MA2506B-S2.5) is capable of 10 μm positioning resolution in the shear direction and 1 μm in the normal direction. The adhesive samples were mounted on a stationary six-axis force/torque transducer (ATI Gamma SI-32-2.5) with a force measurement resolution of approximately ±10 mN. The transducer is mounted on a two-axis goniometer to allow the adhesive and substrate to be precisely aligned.

A sample of adhesive is tested by bringing it into contact with the substrate along a 45° approach trajectory until the adhesive reaches a certain preload depth. The preload depth is defined as the distance by which the adhesive is pressed into the substrate, measured normal to the substrate, from the position where the tips of the adhesive features make first contact. Once the sample is at the appropriate preload depth, it is pulled out of contact along a trajectory at a specified pull-off angle. Such tests are referred to as load-pull tests. To obtain the adhesion limit curve, a battery of load-pull tests were performed for preload depths ranging from 30-80 μm and pull-off angles ranging from 0-90°.

Limit curves were generated for a 1.21 cm$^2$ patch of micro-machined adhesive both before and after the post-treatment process step. For comparison, a limit curve was generated for a 0.37 cm$^2$ patch of photolithographic micro-wedge adhesive, having a rectangular pattern of right triangular prisms (not lamellar ridges), approximately 20 μm wide, 80 μm tall, 200 μm long, and with a tip-to-tip spacing of 40 μm between features. These features are pictured in FIGS. 1A-1B.

The limit curves show the adhesives' performance in force space. Each point corresponds to a combination of normal force and shear force at which failure occurred. The region above the curve is the "safe region": Forces above the curve can be sustained by the adhesive; forces below the curve cause it to fail. The adhesive test results are consistent with the directional adhesion model for geckos, in which adhesion increases with increasing shear force.

Figure 10:
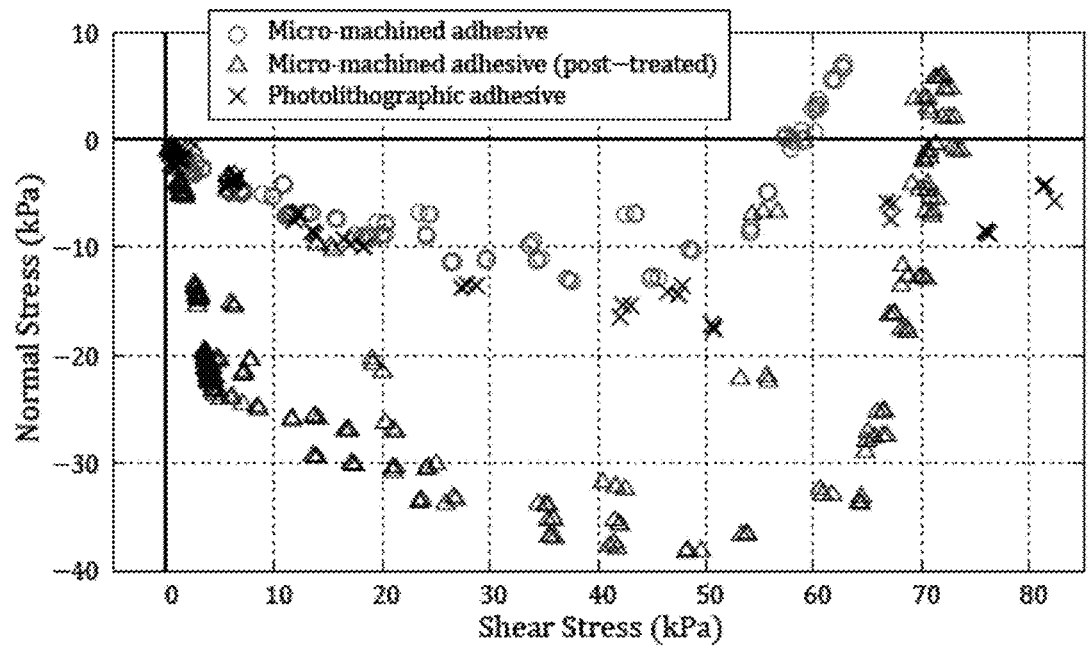
FIG. 10 shows a graph of a comparison of the limit curves for macroscopic arrays of adhesive features produced with micro-machined molds and photolithographic molds, according to one embodiment of the invention.

As shown in FIG. 10, the photolithographic adhesive produces a maximum adhesive stress of approximately 18 kPa when loaded with a shear stress of approximately 51 kPa, and the micro-machined adhesive with no post-treatment achieves a maximum adhesion of 13 kPa at a shear stress of 37 kPa. After post-treatment, the micro-machined adhesive has a maximum adhesion of 38 kPa at a shear stress of 49 kPa.

At high levels of shear stress, all of the adhesive samples show a "roll-off" in adhesion as increasing numbers of features start to slide along the surface.

The micro-machining process has several advantages over the photolithographic process, including increased yield, greater control over the feature shape, a wider choice of mold materials, and vastly improved mold turnaround time (a matter of hours instead of weeks). One drawback is that the wax mold may become damaged when the PDMS is extracted from it, and cannot then be used a second time. To make more adhesives, the top layer of the mold is removed and the underlying material is micromachined anew. However, the manufacturing flexibility of micromachined adhesives makes up for this drawback, and they are a particularly attractive option for applications when rapid design iteration is required.

The theoretical model above provides qualitative insight into the mechanics of the micro-machining process and of the effects of varying the tool and approach angles when trying to make closely spaced cavities. However, its force predictions were not substantiated by experimental results. This suggests that a more sophisticated model, for example using large strain finite element modeling, is necessary for accurate predictions.

Empirical evidence shows that a variety of shapes may be created by changing the trajectory angle θ, including shapes which do not match the profile of the micro-machining tool. Variations with the blade centerline angle λ and with curved trajectories are possible. Different-shaped features affected by post-treatment are possible. The post-treatment process has a dramatic effect on the micro-machined adhesive's performance: the maximum adhesion increases by nearly a factor of 3. The increase in adhesion is due to the better surface finish obtained on the contacting surfaces of the adhesive features (FIG. 5C). According to an aspect of the invention, the tips of the wedge-shaped features include a film of cured elastomeric material having a desired smoothness or texture on one or both sides, in order to take advantage of this increase in adhesion.

The post-treated micro-machined adhesive also achieves more than twice the maximum adhesion obtained previously with photolithographic wedges. For practical reasons, it is difficult to make the photolithographic wedges at the same angle of inclination as the micro-machined wedges; instead, they have one vertical and one angled surface. Consequently, they are stiffer in the normal direction and produce a larger elastic force that subtracts from the net adhesive force. The micro-machining process affords more freedom to vary the angle of inclination and taper, which affect the available adhesion at various levels of applied shear force.

As a further illustration of the effects of varying wedge shape and orientation, the data in FIG. 10 also show much greater adhesion for post-treated micro-machined wedges at low levels of applied shear. As a consequence, the post-treated micro-machined adhesive can support a maximum loading angle of 80° away from the surface for light loads. Whether post-treated or not, the micro-machined adhesives are controllable because they have the property of frictional adhesion: the adhesion increases as the shear load increases, and the adhesion goes to zero as the shear load is removed because the limit curve goes through the origin. This property makes it possible for a climbing robot to detach its feet with very little effort, simply by removing the applied shear force. The result is smooth, efficient climbing.

In addition to climbing, potential applications for gecko-inspired directional adhesives range from fumble-free football gloves to manufacturing processes involving the handling of materials.

By following the process according to the embodiments of the invention, it is possible to create relatively large patches of gecko-inspired directional adhesives using inexpensive equipment. The wedge micro-machining process also permits greater freedom to control the shapes of the features than is possible with molds produced by photolithography. In the present case, by creating features with two angled surfaces instead of one vertical and one angled surface, and utilizing a simple post-treatment "inking" process, it is possible to obtain a much higher maximum loading angle at low levels of shear loading. This could be useful for applications involving lightweight robots such as micro air vehicles or for handling delicate materials.

Two requirements of the process described here are (1) a suitable mold material with near-rigid/plastic behavior and (2) the ability to control the trajectory of the tool, thereby controlling the movement of displaced material, so that mold cavities can be spaced close together while simultaneously controlling the cavity shape. The micro-machining process does not yet match the smooth surface finish obtained with photolithographic methods, but the addition of a post-treatment step can provide a very smooth contacting face and allows more than double the maximum adhesion obtained with corresponding adhesives from photolithographic molds on a flat glass substrate.

The current invention uses inexpensive and readily available materials, including a computer-controlled stage with at least two degrees of freedom (e.g., a CNC milling machine), a microtome blade for the cutting tool, blocks of wax for the molds, and dish soap for the lubricant. Many embodiments are clearly possible. The indenting trajectory may be modified to create different shaped features, with higher aspect ratios, narrower tips, or different angles. Preliminary experiments suggest that even with the present tool and a suitable lubricant, it may be possible to cut directly into a soft metal. The resulting mold would be much more durable and could survive many molding cycles. Other possibilities include machining a temperature-hardening material such as polymer clay, or using an investment casting process to create a second-generation mold from a more durable material than wax.

The adhesives perform very well on glass, but do not perform as well on rougher surfaces. To improve the adhesion on everyday surfaces with micro-scale roughness, a siping step could be employed after de-molding the adhesive. Specifically, the features could be cut perpendicular to their longest dimension at a desired frequency (see FIG. 5B), thereby allowing small, independent sections of the feature to conform to surface roughness.

Additionally, with suitably precise and stiff positioning equipment, much smaller terminal features should also be possible. Even more complicated cavity geometries could be generated using a machining apparatus with a rotational degree of freedom (allowing the tool to change its angle during cutting), or by using a custom-shaped micro-machining tool or multiple tools in sequence. Such a process could create a hierarchical structure, with nano-features on the surfaces of larger micro-wedges. Such developments could lead to a gecko-inspired directional adhesive that performs well on rough surfaces, a goal that has thus far remained elusive.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method of forming synthetic dry adhesives, comprising:
   a. using a combined wedge indenting and orthogonal machining process to form tapered mold cavities in a mold;
   b. filling said tapered mold cavities with an elastomeric adhesive;
   c. curing said elastomeric adhesive in said tapered mold cavities; and
   d. removing said elastomeric adhesive from said mold, wherein a plurality of tapered lamellar ridges extend from a surface of said elastomeric adhesive, wherein said wedge indenting and orthogonal machining process comprises using a wedge-shape tool, wherein a centerline of said wedge-shaped tool is set at an angle $\lambda$ with respect to a top surface of said mold, wherein a trajectory of said tool is at an intermediate angle $\theta$ with respect to a top surface of said mold, wherein said angle $\theta$ is in a range of $0<\theta<2$.

2. The method according to claim 1, wherein said mold comprises a homogeneous wax composition having a Young's modulus to yield stress ratio E/Y greater than 100.

3. The method according to claim 1, wherein said wedge-shaped tool comprises at least a primary bevel.

4. The method according to claim 1, wherein said wedge-shaped tool comprises a primary bevel, a secondary bevel and a tertiary bevel.

5. The method according to claim 1, wherein said wedge-shaped tool comprises a lubricated surface.

6. The method according to claim 1, wherein said wedge-shaped tool is moved along a 2-dimensional or 3-dimensional trajectory into said mold until a tip of said wedge-shaped tool reaches said depth t below a top surface of said mold.

7. The method according to claim 1, wherein a trajectory of said wedge-shaped tool is controlled to move displaced mold material in a desired direction, wherein said mold cavities are desirably spaced and a shape of said cavities is controlled.

8. The method according to claim 1, wherein said elastomeric adhesive comprises an elastomer selected from the group consisting of silicones, polyurethanes, and polypropylene.

9. The method according to claim 1, wherein said substrate surface comprises a smooth or textured surface, wherein said surface is disposed to transfer a desired smoothness or desired texture to a film of said uncured elastomeric material as said uncured elastomeric material cures.

10. The method according to claim 1, wherein a siping step is used when said adhesive is de-molded, wherein said siping step comprises a cut perpendicular to said extending tapered lamellar ridge at a desired frequency to improve adhesion on textured surfaces having micro-scale roughness, wherein independent adhesive sections of said extending tapered lamellar ridge conform to said textured surface.

* * * * *